United States Patent
Jin et al.

(10) Patent No.: US 12,413,311 B2
(45) Date of Patent: Sep. 9, 2025

(54) OPTICAL TRANSMISSION DEVICE AND CONTROL METHOD THEREOF FOR INTEGRATING MULTIPLE SIGNAL BASED ON LITHIUM NIOBATE MODULATION

(71) Applicant: Global Technology Inc., Ningbo (CN)

(72) Inventors: Hao Jin, Ningbo (CN); Fan Yang, Ningbo (CN); Qikun Huang, Ningbo (CN)

(73) Assignee: Global Technology Inc., Ningbo (CN)

( * ) Notice: Subject to any disclaimer, the term of this patent is extended or adjusted under 35 U.S.C. 154(b) by 242 days.

(21) Appl. No.: 18/201,959

(22) Filed: May 25, 2023

(65) Prior Publication Data
US 2024/0171278 A1  May 23, 2024

(30) Foreign Application Priority Data
Nov. 18, 2022  (CN) .......................... 202211443963.X

(51) Int. Cl.
*H04B 10/2575* (2013.01)
*H04B 10/50* (2013.01)

(52) U.S. Cl.
CPC ..... *H04B 10/25753* (2013.01); *H04B 10/505* (2013.01)

(58) Field of Classification Search
CPC ......................... H04B 10/25753; H04B 10/505
USPC ........................................................ 398/115
See application file for complete search history.

(56) References Cited

U.S. PATENT DOCUMENTS

| | | | |
|---|---|---|---|
| 9,244,327 B2 * | 1/2016 | Prosyk | G02F 1/225 |
| 11,855,700 B2 * | 12/2023 | Oron | G02F 1/2257 |
| 11,906,873 B2 * | 2/2024 | Argyris | G02F 1/212 |
| 2002/0089733 A1 * | 7/2002 | Gopalakrishnan | H04B 10/505 359/254 |
| 2011/0135242 A1 * | 6/2011 | Prosyk | G02F 1/225 385/3 |
| 2018/0359047 A1 * | 12/2018 | Vassilieva | H04B 10/5057 |
| 2023/0375893 A1 * | 11/2023 | Kurahashi | G02F 1/212 |

(Continued)

FOREIGN PATENT DOCUMENTS

| | | | | |
|---|---|---|---|---|
| CN | 105044931 A | * | 11/2015 | G02F 1/015 |
| WO | WO-2022225559 A1 | * | 10/2022 | G02F 1/2255 |

*Primary Examiner* — Amritbir K Sandhu
(74) *Attorney, Agent, or Firm* — Grossman Tucker Perreault & Pfleger, PLLC

(57) ABSTRACT

An optical transmission device includes a laser configured to generate an initial optical signal, radio-frequency signal channels configured to transmit radio-frequency modulation signal, a ground channel disposed in parallel with and connected to the radio-frequency signal channels, an input optical fiber receiving the initial optical signal, a front-end optical splitting element splitting the initial optical signal, and optical transmission units. Each optical transmission unit includes a rear-end optical splitting element connected to the front-end optical splitting element, two optical splitting paths, an optical combining element, and an output optical fiber configured to output the optical modulation signal. One of the radio-frequency signal channels is disposed between the two optical splitting paths, and two of the radio-frequency signal channels are disposed at two sides of the two optical splitting paths, to modulate the optical splitting signal with the corresponding radio-frequency modulation signal.

11 Claims, 3 Drawing Sheets

(56) References Cited

U.S. PATENT DOCUMENTS

2024/0171278 A1\* 5/2024 Jin ................... H04B 10/25753
2024/0210784 A1\* 6/2024 Hayami ................. G02F 1/212

\* cited by examiner

OPTICAL TRANSMISSION DEVICE AND CONTROL METHOD THEREOF FOR INTEGRATING MULTIPLE SIGNAL BASED ON LITHIUM NIOBATE MODULATION

CROSS-REFERENCE TO RELATED APPLICATIONS

This non-provisional application claims priority under 35 U.S.C. § 119(a) on Patent Application No(s). 202211443963.X filed in China on Nov. 18, 2022, the entire contents of which are hereby incorporated by reference.

BACKGROUND

1. Technical Field

This disclosure relates to a transmission technique of radio over fiber (ROF), particularly relates to an optical transmission device for integrating multiple signal based on lithium niobate modulation, which can be used in 5G communication system.

2. Related Art

With the development of mobile networks along with expanded applications and services, more and more devices are connected within the same network to drive exploding growth of mobile data transmission, which has become quite a challenge for entire current network systems.

When network capacity may no longer be able to catch up with rising growth of future network traffic, how to further utilize network resource in a more efficient way at no expense of user experience in any heterogeneous mobile network setting could be achieved by simplifying mutual operations within the same networks.

SUMMARY

Accordingly, this disclosure provides an optical transmission device for integrating multiple signal based on lithium niobate modulation.

According to one or more embodiment of this disclosure, an optical transmission device for integrating multiple signal based on lithium niobate modulation includes a laser configured to generate an initial optical signal, a plurality of radio-frequency signal channels configured to each transmit radio-frequency modulation signal, a ground channel disposed in parallel with the radio-frequency signal channels and connected to the radio-frequency signal channels and configured to be grounded, an input optical fiber connected to the laser and configured to receive the initial optical signal, a front-end optical splitting element disposed in the input optical fiber and configured to split the initial optical signal, and a plurality of optical transmission units. Each optical transmission unit includes a rear-end optical splitting element connected to the front-end optical splitting element and configured to split the split initial optical signal to generate two optical splitting signals, two optical splitting paths connected to the rear-end optical splitting element and configured to transmit the two optical splitting signals, an optical combining element connected to the two optical splitting paths and configured to combine the two optical splitting signals to generate an optical modulation signal, and an output optical fiber connected to the optical combining element and configured to output the optical modulation signal. One of the radio-frequency signal channels is disposed between the two optical splitting paths, and two of the radio-frequency signal channels are disposed at two sides of the two optical splitting paths, to modulate the optical splitting signal with the corresponding radio-frequency modulation signal.

According to one or more embodiment of this disclosure, a control method of the optical transmission device for integrating multiple signal based on lithium niobate modulation includes providing said optical transmission device; providing a digital signal to one of the radio-frequency signal channels, and providing an analog signal to another one of the radio-frequency signal channels.

In view of the above description, the optical transmission device for integrating multiple signals based on lithium niobate modulation of the present disclosure provides an optical transmission device with a lithium niobate modulator, to be configured to modulate the optical signal with multiple radio-frequency signal through optical fiber. Except for the input optical fiber and the output optical fiber, the lithium niobate modulator further includes a radio-frequency signal channel and a ground channel so that the optical splitting signal from the input optical fiber and generated by the optical splitting element can be modulated by the radio-frequency modulation signal. In this way, an optical transmission device with low power consumption, small size, high performance, simple organization, and the capability of transmitting signals with a base station can be achieved. In addition, the optical transmission device of the present disclosure can be implemented as a form of multiple-receive-multiple-transmit (2T2R or more), and the multiple radio-frequency signal channels may further be flexibly configured with analog signal and digital signal of various number independent with each other. Therefore, a part of the signal may be selectively modulated with analog signal and another part of the signal may be selectively modulated with digital signal to increase the flexibility in application. Under the condition of complex network, small terminal size and low power consumption, an one-piece optical module of ROF which modulates digital and analog signal can have the edge of flexibly constructing network, reducing terminal size, and efficiently use network resource.

The above descriptions of the content of this disclosure and the following illustrations about the embodiments serve to demonstrate and explain the spirit and the principle of the present invention, and to provide further explanations to the claims of the present invention.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
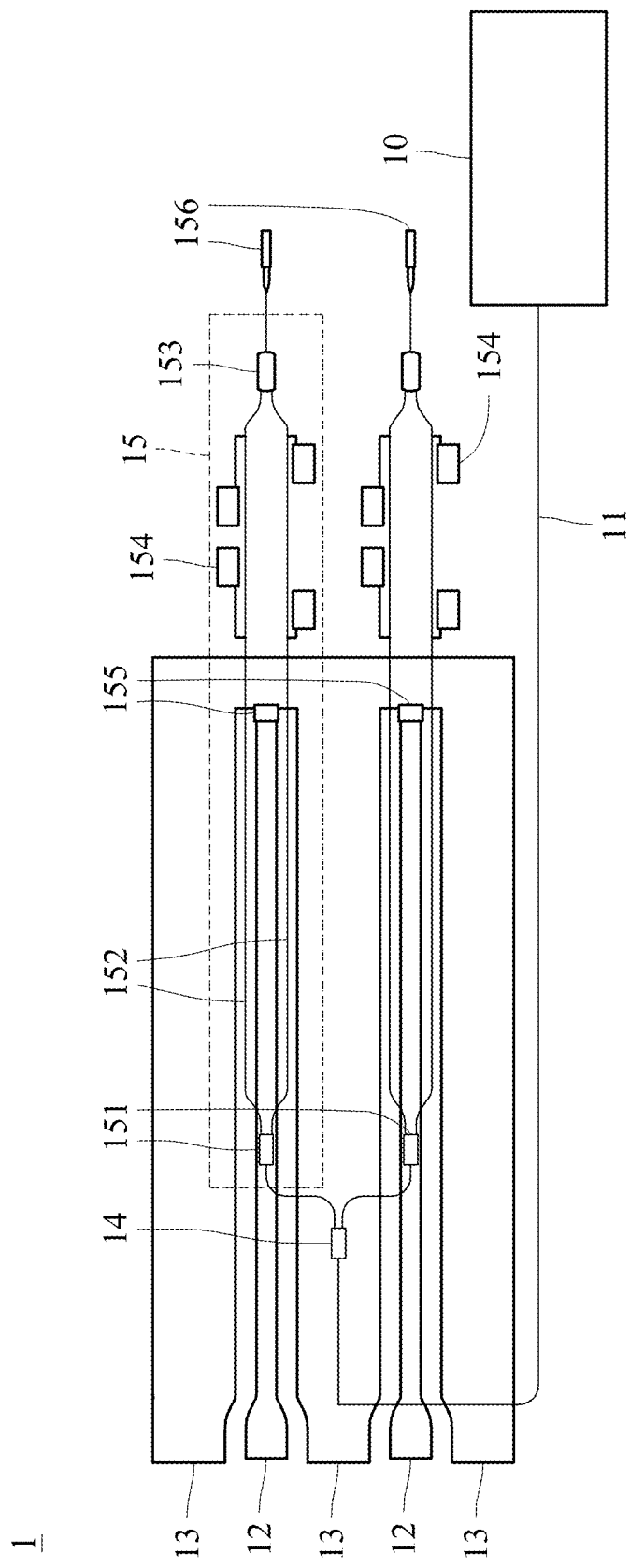
FIG. 1 schematically illustrates an optical transmission device for integrating multiple signal based on lithium niobate modulation according to an embodiment of the present disclosure.

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

In the following descriptions, the term "first element" or "first signal" may indicate that there is only one element and one signal, or may indicate that there are other elements and signals in the present disclosure. Similar terms should refer to similar elements unless otherwise indicated. For example, "element" can generally include "first element" and "second element", and "first element" may be similar to "second element".

The optical transmission device for integrating multiple signal based on lithium niobate modulation according to an embodiment of the present disclosure may be applied to the optical communication or the distributed antenna system (DAS) and can provide an optical transmission device capable of modulating the optical signal transmitted in the optical fiber through the radio-frequency signal. The optical transmission device of the present disclosure may be configured to transmit and receive signals for the base station under/on the tower, and may also be configured to transmit and receive signals of the optical transmission sub-module (transmitter optical subassembly, TOSA) at the outdoor/indoor antenna end.

In the following descriptions, an optical signal generally refers to an electromagnetic wave signal transmitted through an optical fiber as media. The optical signal has an advantage of lower energy loss and higher signal density and may be transmitted in the form of pulse or continuous wave. In the following embodiments, the optical signal may be generated by a coherent source such as a laser or a laser diode, and the radio-frequency signal may be an electrical signal generated by the antenna after receiving a radio signal, which may be in form of an analog signal or a digital signal.

According to the optical transmission device for integrating multiple signal based on lithium niobate modulation of the present disclosure, the information of the radio-frequency signal can be modulated into the optical signal so that the optical signal may carry the information of the radio-frequency signal. Therefore, the optical signal with the information of the radio-frequency signal can be efficiently and securely transmitted through the optical fiber, and the optical signal may also be converted into an electrical signal through another electro-optic modulator (EOM) for subsequent process. Generally speaking, the modulation can be categorized into digital modulation and analog modulation based on whether the modulation signal belongs to a digital signal or analog signal, and the modulation method may include amplitude modulation (AM), frequency modulation (FM), phase modulation (PM), quadrature amplitude modulation (QAM), pulse width modulation (PWM), or the like. Different modulation methods may be applied with the same modulation effect. For example, the phase modulation method can be applied to generate constructive interference with the effect of amplitude modulation. Thus, the scope of the present disclosure is not limited to various modulation methods.

The optical transmission device based on lithium niobate modulation method will be described in the following descriptions. Please refer to FIG. 1 which schematically illustrates an optical transmission device for integrating multiple signals based on lithium niobate modulation according to an embodiment of the present disclosure. The optical transmission device 1 includes a laser 10 configured to generate an initial optical signal, a plurality of radio-frequency signal channels 12 configured to each transmit radio-frequency modulation signal, a ground channel 13 disposed in parallel with the radio-frequency signal channels 12 and connected to the radio-frequency signal channels 12 and grounded, an input optical fiber 11 connected to the laser 10 and configured to receive the initial optical signal, a front-end optical splitting element 14 disposed in the input optical fiber 11 and configured to split the initial optical signal, and a plurality of optical transmission units 15. Each optical transmission unit 15 includes a rear-end optical splitting element 151 connected to the front-end optical splitting element 14 and configured to further split the initial optical signal has been split by the front-end optical splitting element 14, to generate two optical splitting signals, two optical splitting paths 152 connected to the rear-end optical splitting element 151 and configured to transmit the two optical splitting signals, an optical combining element 153 connected to the two optical splitting paths 152 and configured to combine the two optical splitting signals to generate an optical modulation signal, and an output optical fiber 156 connected to the optical combining element 153 to output the optical modulation signal. One of the radio-frequency signal channels 12 is disposed between the two optical splitting paths 152, and two of the ground channels 13 are disposed at two sides of the two optical splitting paths 152, to modulate the optical splitting signal with the corresponding radio-frequency modulation signal.

In the present embodiment, as shown in FIG. 1, the laser 10 providing the initial optical signal could be a laser diode. The wavelength of the electromagnetic wave of the initial optical signal may be in wavelength ranges of infrared, visible light, ultraviolet light, or others, and the initial optical signal may be an electromagnetic pulse or continuous wave. The initial optical signal emitted by the laser 10 can be coupled into the input optical fiber 11 through focusing lens. In the present embodiment, the input optical fiber 11 is at least connected to one first optical splitting element 14. In another embodiment, the input optical fiber 11 may be selectively connected to multiple front-end optical splitting elements, and the optical signal may be modulated through a plurality of radio-frequency input signals, which will be described in the following descriptions.

In the present embodiment, the initial optical signal is split into two first optical splitting signals by the first optical splitting element 14, with equal or different powers based on polarization state of the initial optical signal. Each part of the initial optical signal is connected to each of the two optical splitting paths 152 of the optical transmission unit 15 through the rear-end optical splitting element 151. In the optical transmission unit 15, the radio-frequency signal channel 12 disposed in parallel between the two optical splitting paths 152 may receive the radio-frequency modulation signal. The first radio-frequency signal channel 12 is connected to the first ground channels 13 located on both sides thereof, so that there is a long and narrow gap with a certain width between the ground channel and the radio-frequency signal channel disposed in parallel. With the above arrangement, the electrical potential difference between both sides of the gap results in a distribution of an electrical field, which might be used for modulation of the first optical splitting signal in the first optical splitting path 152.

The optical transmission device 1 may have two radio-frequency signal channels 12 as shown in FIG. 1. Here, one of the two radio-frequency signal channels 12 may be referred to as the first radio-frequency signal channel 12 (which could be the radio-frequency signal channel in above) and the other may be referred to as the second radio-frequency signal channel 12 (which could be the radio-frequency channel in below). The second radio-frequency signal channel 12 also corresponds to the second ground channel 13, the second front-end optical splitting element 151, the second optical splitting path 152, the second optical transmission unit 15. In the following descriptions, the first element and the second element will share the same reference number and the same function unless otherwise indicated, thus the repeated description may be omitted.

There might be two second ground channels 13 on both sides of the second radio-frequency signal channel 12 and there might be two first ground channels 13 on both sides of the first radio-frequency signal channel 12, with the first and second radio-frequency signal channels 12 sharing one ground channel in middle.

In the optical transmission device 15 of the present embodiment, a terminal resistor 155 may be disposed between the first radio-frequency signal channel 12 and its corresponding ground channel 13 and serving as a load of the first radio-frequency signal channel. And it is worth noting that the first terminal resistor 155 may be connected to the first radio-frequency signal channel 12 and its ground channel 13, when another first terminal resistor 155 may be coupled to the second radio-frequency signal channel 12 and its corresponding ground channel 13. In the present embodiment, the optical transmission device 15 may further include a hot electrode 154 which is directly connected to the optical splitting path 152 and configured to apply a voltage to the optical splitting path 152 to additionally modulate the optical splitting signal (such as the phase of the optical signal). The two optical splitting signals (which have been modulated) may be combined through the optical combining element 153 to generate an optical modulation signal which may be output from the optical transmission device 1 through the output optical fiber 156. Accordingly, the present embodiment with a double-arms lithium niobate modulation scheme may be designed as a two-receive-two-transmit (2T2R) optical module to receive the analog signal and the digital signal independent with each other so as to enable signal transmission of them between base stations. Compared with an ordinary remote antenna unit (RAU), the optical transmission device of the present disclosure uses the ROF technique to improve the modulation linearity and the bandwidth, lower the size and power consumption, and reduce the construction complexity. Further compared with the ordinary ROF optical module, the optical transmission device of the present disclosure realizes modulating and transmitting with two or more channels of radio-frequency signal.

Figure 2:
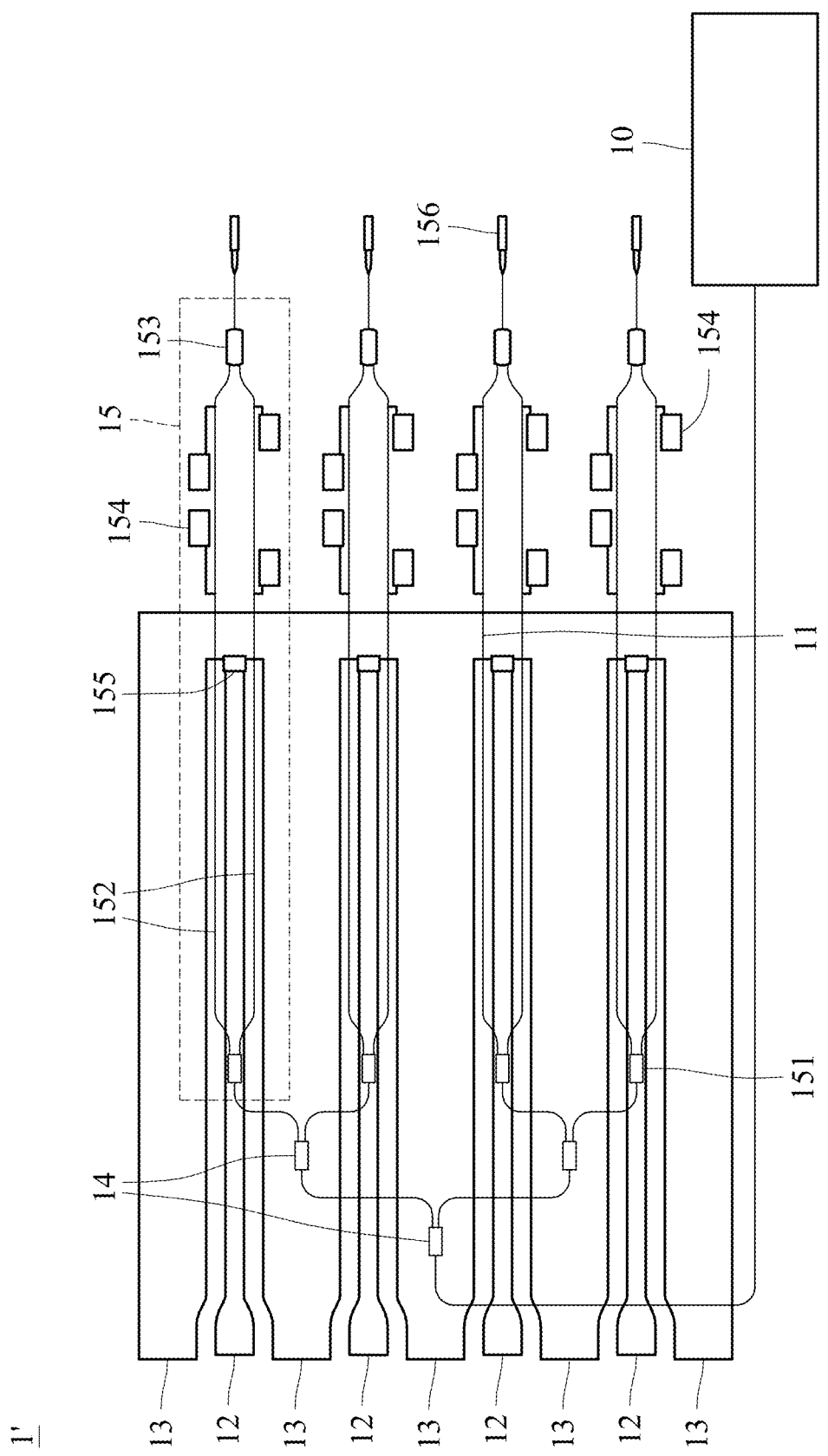
FIG. 2 schematically illustrates an optical transmission device for integrating multiple signal based on lithium niobate modulation according to another embodiment of the present disclosure.

Please refer to FIG. 2 which schematically illustrates an optical transmission device for integrating multiple signals based on lithium niobate modulation according to another embodiment of the present disclosure. In the present embodiment, the optical transmission device 1' has four optical transmission units 15 (namely, the first to fourth optical transmission units 15, respectively). The four optical transmission units 15 correspond to the four radio-frequency signal channels 12, four ground channels 13, four rear-end optical splitting elements 151, four optical splitting paths 152, four optical combining elements 153 and four output optical fibers 156.

The present embodiment realizes four-arm modulation function so that more output optical fibers can be implemented through simple modification based on the illustration of the present embodiment. In the present embodiment, the optical transmission device 1' includes three (instead of four) front-end optical splitting elements 14 disposed in the input optical fiber 11 and configured to split the initial optical signals into four parts corresponding to the four optical transmission units 15. To this end, the three front-end optical splitting elements 14 can be divided into one primary front-end optical splitting element 14 (the one on the left) and two secondary front-end optical splitting elements 14 (those on the right to the primary front-end optical splitting element). The initial optical signal can pass through the primary front-end optical splitting element 14, which might be used to split such initial optical signal into two parts, with those two parts passing through the two secondary front-end optical splitting elements 14, each of which might split each received part of the initial optical signal to two parts. As such, each of the four rear-end optical splitting elements 151 might receive one part of the initial optical signal. Each part of initial optical signal passing through each optical transmission unit 15 may have same or different powers, polarization states, and wavelengths based on the characteristic of the front-end optical splitting element 14.

In the present embodiment, four hot electrodes 154 and four terminal resistors 155 are disposed in a fashion similar to the previously discussed embodiment. Not that the first radio-frequency signal channel 12 and the second radio-frequency signal channel 12 may receive a first radio-frequency signal and a second radio-frequency signal (such as a digital signal and an analog signal) independent with each other, to modulate the two optical splitting signals, respectively. By providing the first radio-frequency modulation signal and the second radio-frequency modulation signal different from each other to the first radio-frequency signal channel 12 and the second radio-frequency signal channel 12, the two optical modulation signals can be different from each other when being outputted. Through the above configuration, the efficiency of space utilization can be improved. Specifically, the optical transmission device integrating multiple optical transmission units 15 may reduce usage of the optical fiber. In addition, although there is one ground channel 13 disposed between the two neighboring radio-frequency signal channels 12 in the present embodiment, there may be two ground channels disposed between two radio-frequency signal channels in another embodiment. In other words, the staggering configuration (GSGSG) of ground channels (G) and radio-frequency modulation signal channels (S) illustrated in FIG. 1 can be substituted as GSGGSG, and the configuration of GSGSGSGSG illustrated in FIG. 2 can be substituted as GSGGSGGSGGSG, so that the radio-frequency modulation signal channels and the ground channels can modulate the optical signals passing through the optical splitting paths.

Accordingly, the present disclosure provides the optical transmission device capable of generating multiple optical modulation signals independent with each other. Note that, though the number of output optical fibers illustrated in FIG. 1 and FIG. 2 is an even number, it is not limited to the present disclosure. For one implementation, two front-end optical splitting elements 14 with an upstream and downstream relationship can be applied to generate three optical modulation signals in the end. For example, given that the front-end optical splitting element can split the initial optical signal into two parts with 50% of power, respectively, another front-end optical splitting element can be applied to one of the two parts of the initial optical signal allowing for the same to be split into three parts with 50%, 25%, and 25% of power, respectively. Therefore, the scope of the present disclosure should not be limited to the number of output channels and modulation channels.

Further descriptions about the modulation mechanism of the optical transmission module based on the lithium niobate are included herein. An optical waveguide (such as the first optical splitting path 152) made of lithium niobate crystal may serve as an electro-optics modulator (EOM), which can modulate the optical signal transmitted through an optical waveguide with an external electrical field (such as the electrical field between the first radio-frequency signal channel 12 and the ground channel 13) based on the Pockels effect and the Kerr effect, which are originated from the relevance between the refractive index of material and external electrical field intensity. The described modulation mechanism should be understood as an illustrative description and is not limited to the present disclosure. Practically, the manipulation of the electrical field might change other optical characteristics such as the optical absorption rate, therefore populating the related mechanism.

The laser 10 of the present embodiment may generate a polarized optical signal such as a linearly polarized optical signal or a circularly polarized optical signal, and the optical splitting element may split the optical signal through the polarization characteristic. In addition, in some embodiments, the optical splitting element (such as a beam splitter) may be integrated with the optical combining element (such as a beam combiner). In other embodiments, the relative positions of the hot electrode and the radio-frequency signal channel can be changed, allowing for the inputted optical signal to be modulated by the hot electrode first before being modulated by the radio-frequency signal channel and the ground channel.

Figure 3:
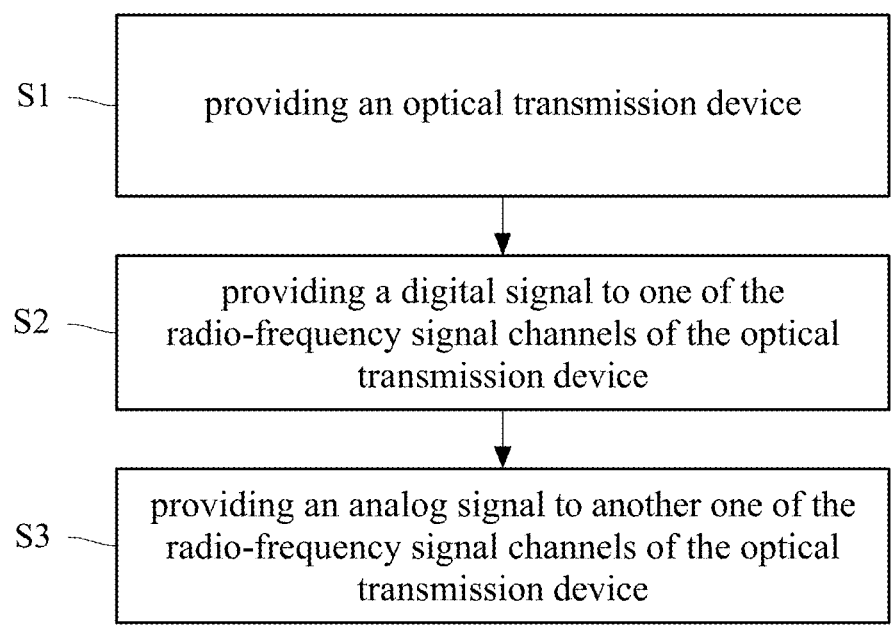
FIG. 3 is a flow chart of a controlling method of an optical transmission device for integrating multiple signal based on lithium niobate modulation according to an embodiment of the present disclosure.

Please refer to FIG. 3 which is the controlling method based on the optical transmission device 1 or 1' based on the above embodiments. The controlling method includes step S1: providing an optical transmission device, wherein the optical device may be one of the embodiments illustrated in FIG. 1 or FIG. 2; step S2: providing a digital signal to one of the radio-frequency signal channels of the optical transmission device; step S3: providing an analog signal to another one of the radio-frequency signal channels of the optical transmission device. In addition, steps S2 and S3 can be sequentially swapped.

The optical transmission device 1 or 1' of the present embodiment may be encapsulated in a small form factor pluggable (SFP) form or a dual small form factor pluggable (DSFP) form, and can be applied to the existed communication optical network system.

In view of the above description, the optical transmission device for integrating multiple signals based on lithium niobate modulation of the present disclosure provides an optical transmission device with a lithium niobate modulator, to be configured to modulate the optical signal with multiple radio-frequency signals through the optical fibers. Except for the input optical fiber and the output optical fiber, the lithium niobate modulator further includes a radio-frequency signal channel and a ground channel so that the optical splitting signal from the input optical fiber and generated by the optical splitting element can be modulated by the radio-frequency modulation signal. In this way, an optical transmission device with low power consumption, small size, high performance, simple organization, and the capability of transmitting signals with a base station can be achieved. In addition, the optical transmission device of the present disclosure can be implemented as a form of multiple-receive-multiple-transmit (2T2R or more), and the multiple radio-frequency signal channels may further be flexibly configured with analog signal and digital signal of various number independent with each other. Therefore, a part of the signal may be selectively modulated with analog signal and another part of the signal may be selectively modulated with digital signal to increase the flexibility in application.

Although the present invention is disclosed in the foregoing embodiments, it is not intended to limit the present invention. Changes and modifications made without departing from the spirit and scope of the present invention belong to the scope of patent protection of the present invention. For the scope defined by the present invention, please refer to the attached claims.

What is claimed is:

1. An optical transmission device for integrating multiple signals based on lithium niobate modulation, comprising:
   a laser configured to generate an initial optical signal;
   a plurality of radio-frequency signal channels, each of the radio-frequency signal channels configured to transmit a radio-frequency modulation signal;
   a plurality of ground channels disposed in parallel with the plurality of radio-frequency signal channels and connected to the plurality of radio-frequency signal channels;
   an input optical fiber connected to the laser and configured to receive the initial optical signal;
   a front-end beam splitter disposed in the input optical fiber and configured to split the initial optical signal; and
   a plurality of optical transmission units, each comprising:
      a rear-end beam splitter connected to the front-end beam splitter and configured to split the initial optical signal that is split by the front-end beam splitter, to generate two optical splitting signals;
      two optical splitting paths connected to the rear-end beam splitter and configured to transmit the two optical splitting signals, respectively;
      an beam combiner connected to the two optical splitting paths and configured to combine the two optical splitting signals to generate an optical modulation signal; and
      an output optical fiber connected to the beam combiner and configured to output the optical modulation signal;
   wherein one of the plurality of radio-frequency signal channels is disposed between the two optical splitting paths, and two of the plurality of ground channels are disposed at two sides of the two optical splitting paths, to modulate the optical splitting signal with the radio-frequency modulation signal that corresponds to the optical splitting signal.

2. The optical transmission device for integrating multiple signal based on lithium niobate modulation of claim 1, wherein each of the plurality of optical transmission units further comprises a hot electrode which is disposed at each of the two optical splitting paths and configured to modulate the two optical splitting signals.

3. The optical transmission device for integrating multiple signal based on lithium niobate modulation of claim 1, wherein each of the plurality of optical transmission units further comprises a terminal resistor disposed between one of the plurality of radio-frequency signal channels and one of the plurality of ground channels and connected to the radio-frequency signal channel and the ground channel.

4. The optical transmission device for integrating multiple signal based on lithium niobate modulation of claim 1, wherein the optical transmission device is encapsulated in a small form factor pluggable (SFP) form or a dual small form factor pluggable (DSFP) form.

5. A control method of the optical transmission device for integrating multiple signal based on lithium niobate modulation, comprising:
   providing the optical transmission device according to claim 1;
   providing a digital signal to one of the plurality of radio-frequency signal channels; and
   providing an analog signal to another one of the plurality of radio-frequency signal channels.

6. A control method of the optical transmission device for integrating multiple signal based on lithium niobate modulation, comprising:
   providing the optical transmission device according to claim 2;
   providing a digital signal to one of the plurality of radio-frequency signal channels; and
   providing an analog signal to another one of the plurality of radio-frequency signal channels.

7. A control method of the optical transmission device for integrating multiple signal based on lithium niobate modulation, comprising:
   providing the optical transmission device according to claim 3;
   providing a digital signal to one of the plurality of radio-frequency signal channels; and
   providing an analog signal to another one of the plurality of radio-frequency signal channels.

8. A control method of the optical transmission device for integrating multiple signal based on lithium niobate modulation, comprising:
   providing the optical transmission device according to claim 4;
   providing a digital signal to one of the plurality of radio-frequency signal channels; and
   providing an analog signal to another one of the plurality of radio-frequency signal channels.

9. The optical transmission device for integrating multiple signal based on lithium niobate modulation of claim 1, wherein the plurality of radio-frequency signal channels includes at least one RF signal channel configured to transmit a digital signal and at least one RF signal channel configured to transmit an analog signal.

10. The optical transmission device for integrating multiple signal based on lithium niobate modulation of claim 9, wherein the plurality of radio-frequency signal channels includes a total of two RF signal channels, one of the two RF signal channels transmits the digital signal, and the other one of the two RF signal channels transmits the analog signal.

11. The optical transmission device for integrating multiple signal based on lithium niobate modulation of claim 9, wherein the plurality of radio-frequency signal channels includes a total of four RF signal channels, two of the four RF signal channels respectively transmits the digital signal, and the other two of the four RF signal channels respectively transmits the analog signal.

\* \* \* \* \*